US008386116B2

(12) United States Patent
Lipscomb et al.

(10) Patent No.: US 8,386,116 B2
(45) Date of Patent: Feb. 26, 2013

(54) UNIVERSAL SERIAL BUS MEMORY DEVICE FOR USE IN A VEHICLE DIAGNOSTIC DEVICE

(75) Inventors: Edward Lipscomb, Lakeville, MN (US); Manokar Chinnadurai, Owatonna, MN (US); Corneliu Boac, Farmington, MN (US)

(73) Assignee: Service Solutions U.S., LLC, Warren, MI (US)

( * ) Notice: Subject to any disclaimer, the term of this patent is extended or adjusted under 35 U.S.C. 154(b) by 1341 days.

(21) Appl. No.: 11/783,153

(22) Filed: Apr. 6, 2007

(65) Prior Publication Data
US 2008/0103656 A1 May 1, 2008

Related U.S. Application Data

(60) Provisional application No. 60/854,434, filed on Oct. 26, 2006.

(51) Int. Cl.
G06F 7/00 (2006.01)

(52) U.S. Cl. ............... 701/29.1; 701/33.2; 701/33.3; 701/33.4; 701/115; 701/430

(58) Field of Classification Search .............. 701/29, 701/33, 35, 36, 29.1, 33.2, 33.3, 33.4, 115, 701/430; 711/E12.008; 707/821, 824
See application file for complete search history.

(56) References Cited

U.S. PATENT DOCUMENTS

| | | | | | |
|---|---|---|---|---|---|
| 4,156,907 | A | * | 5/1979 | Rawlings et al. | 709/212 |
| 5,410,676 | A | * | 4/1995 | Huang et al. | 711/202 |
| 5,479,347 | A | * | 12/1995 | Oguro et al. | 701/33.2 |
| 5,761,732 | A | * | 6/1998 | Shaberman et al. | 711/157 |
| 6,014,724 | A | * | 1/2000 | Jenett | 711/103 |
| 6,169,516 | B1 | * | 1/2001 | Watanabe et al. | 342/357.51 |
| 6,470,190 | B2 | * | 10/2002 | Karhu | 455/550.1 |
| 7,664,984 | B2 | * | 2/2010 | Wang et al. | 714/15 |
| 7,689,861 | B1 | * | 3/2010 | Wang et al. | 714/6.12 |
| 2003/0167345 | A1 | * | 9/2003 | Knight et al. | 709/249 |
| 2004/0059755 | A1 | * | 3/2004 | Farrington et al. | 707/200 |
| 2005/0015408 | A1 | * | 1/2005 | Shona | 707/200 |
| 2006/0044934 | A1 | * | 3/2006 | Wong et al. | 365/239 |
| 2006/0101311 | A1 | * | 5/2006 | Lipscomb et al. | 714/47 |
| 2007/0050106 | A1 | * | 3/2007 | Chinnadurai | 701/29 |
| 2008/0033609 | A1 | * | 2/2008 | Razavi | 701/33 |
| 2008/0195768 | A1 | * | 8/2008 | Lowe et al. | 710/14 |
| 2009/0150118 | A1 | * | 6/2009 | Naima | 702/165 |
| 2010/0042288 | A1 | * | 2/2010 | Lipscomb et al. | 701/33 |
| 2011/0055629 | A1 | * | 3/2011 | Lee et al. | 714/15 |

* cited by examiner

*Primary Examiner* — Khoi Tran
*Assistant Examiner* — Jorge Peche
(74) *Attorney, Agent, or Firm* — Baker & Hostetler, LLP

(57) ABSTRACT

A method and apparatus are provided that allow an off-the-shelf USB flash memory device to used with a scan tool. The USB flash memory device can have a different operating system then the proprietary operating system of the scan tool. The method and apparatus allows the scan tool to read from and write on the USB flash memory device regardless of the formatted operating system on the device.

8 Claims, 3 Drawing Sheets

UNIVERSAL SERIAL BUS MEMORY DEVICE FOR USE IN A VEHICLE DIAGNOSTIC DEVICE

CROSS-REFERENCE TO RELATED APPLICATIONS

This application claims priority to provisional U.S. patent application entitled, "Universal Serial Bus Memory Device for Use in a Vehicle Diagnostic Device," filed Oct. 26, 2006, having a Ser. No. 60/854,434, the disclosure of which is hereby incorporated by reference in its entirety.

FIELD OF THE INVENTION

The present invention relates generally to a memory device used in a vehicle diagnostic device. More particularly, the present invention relates to universal serial bus flash memory device used to store information for use in a vehicle diagnostic tool.

BACKGROUND OF THE INVENTION

Diagnostic scan tools are designed to diagnose problems in a vehicle. The diagnostic scan tool communicates and diagnoses problems with the vehicle via software stored in a memory. The memory may be internal or external to the scan tool. The diagnostic software used to diagnose the vehicle is often stored on memory devices such as a compact flash (CF) card. Additionally, data collected by the diagnostic scan tool is often stored on the same CF card. However, the CF card has limited memory and the diagnostic software often takes up most of the memory space on the CF card. Thus, data received from the vehicle that can be stored for later retrieval is limited.

The operating system used in the diagnostic scan tool varies with the manufacturers of the tool and is often proprietary in nature. The various flash memories (USB flash drive, memory stick, SD card, etc.) that can be purchased off-the-shelf are typically formatted for either the Windows® operating system (OS) by Microsoft® or Mac X from Apple® and thus, are not compatible with proprietary operating systems used by scan tool manufactures. For example, the flash memory device is typically format using DOS FAT16/FAT32 file system for use in personal computers, cameras and personal digital assistants. Therefore, if a flash memory device purchased off-the-shelf is inserted into a scan tool, the scan tool may not recognize the flash memory device in order to read it or write onto it.

There is a need to be able to read and write onto USB flash memory device that is purchased off-the-shelf regardless of the operating system that the memory device and the scan tool are formatted for.

SUMMARY OF THE INVENTION

The foregoing needs are met, to a great extent, by the present invention, wherein in one aspect an apparatus is provided that in some embodiments allows an off-the-shelf USB flash memory device to be used with a scan tool.

In accordance with one embodiment of the present invention, a computer software product for use by a vehicle diagnostic scan tool is provided and can include a computer-readable medium in which program instructions are stored, which instructions, when read by the diagnostic scan tool, can cause the diagnostic scan tool to perform the steps that include detecting if a USB flash memory device that is formatted for an operating system that is different from the operating system used by the vehicle diagnostic scan tool is coupled to the vehicle diagnostic scan tool, collecting diagnostic information from a vehicle that is coupled to the vehicle diagnostic scan tool, and writing the diagnostic information on the USB flash memory device at a sector level.

In accordance with another embodiment of the present invention, a method of writing onto a USB flash memory device connected to a vehicle diagnostic scan tool is provided and can include detecting if the USB flash memory device that is formatted for an operating system that is different from the operating system used by the vehicle diagnostic scan tool is coupled to the vehicle diagnostic scan tool, collecting diagnostic information from a vehicle that is coupled to the vehicle diagnostic scan tool, and writing the diagnostic information on the USB flash memory device at a sector level.

In accordance with yet another embodiment of the present invention, a vehicle diagnostic scan tool having a computer software product, the product includes a computer-readable medium in which program instructions are stored, which instructions, when read by the vehicle diagnostic scan tool, cause the vehicle diagnostic scan tool to perform the steps of detecting if a USB flash memory device that is formatted for an operating system that is different from the operating system used by the vehicle diagnostic scan tool is coupled to the vehicle diagnostic scan tool, collecting diagnostic information from a vehicle that is coupled to the vehicle diagnostic scan tool, and writing the diagnostic information on the USB flash memory device at a sector level.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
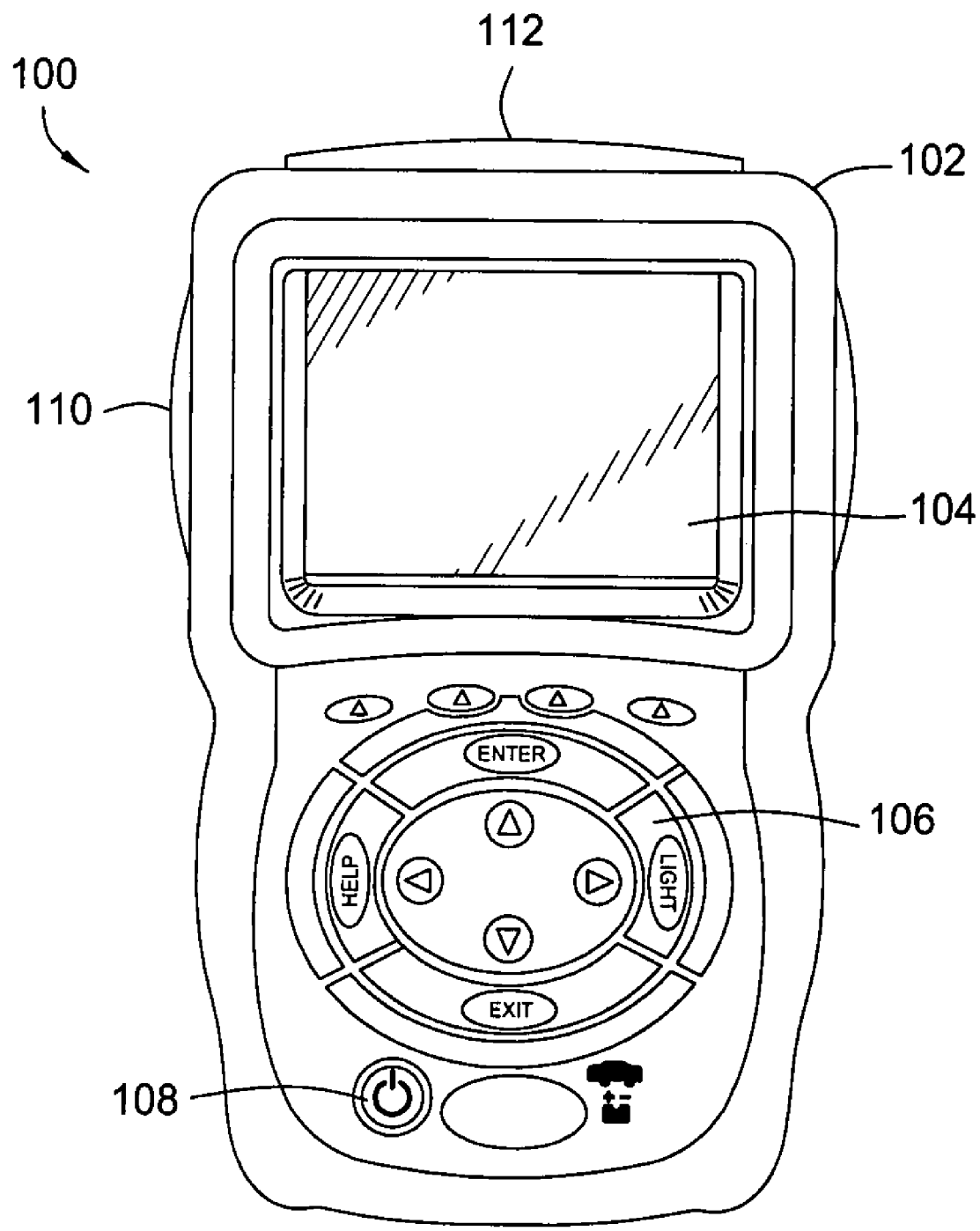
FIG. 1 is a front view of a scan tool that can use a USB flash memory device to save information from a diagnostic test according to an embodiment of the invention.

The invention will now be described with reference to the drawing figures, in which like reference numerals refer to like parts throughout. An embodiment in accordance with the present invention provides a method to save diagnostic data on an USB flash memory device that is coupled to a diagnostic scan tool.

FIG. 1 is a front view of a scan tool 100 that can use a USB flash memory device to save information from a diagnostic test according to an embodiment of the invention. The scan tool 100 can be any computing device, such as, for example, the Nemisys scan tool from Service Solutions (a unit of the SPX Corporation) in Owatonna, Minn. The scan tool 100 includes a housing 102 to house the various components of the scan tool, such as a display 104, a user interface 106, a power key 108, a memory card reader 110 and a connector interface 112. The display 104 can be any display, for example, LCD (liquid crystal display), VGA (video graphics array), touch display (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate various menus that are presented on the display. The user interface 106 can also be a mouse or any other suitable input device, including a keypad. The user interface 106 can also include numbers or be alphanumeric. The power key 108 allows the user to turn the scan tool 100 on and off, as required.

Memory card reader 110 can be a single type card reader, such as a compact flash card, floppy disc, memory stick, secure digital, other types of flash memory or other types of memory. The memory card reader 110 can be a reader that reads more than one of the aforementioned memory such as a combination memory card reader. Additionally, the card reader 110 can also read any other computer readable medium, such as CD, DVD, UMD, etc.

The connector interface 112 allows the scan tool 100 to connect to an external device, such as an ECU (electronic control unit) of a vehicle, a computing device, an external communication device (such as a modem), a network, etc. through a wired or wireless connection. Connector interface 112 can also include a USB, FIREWIRE, modem, RS232, RS48J, and other connections to communicate with external devices, such as a hard drive, USB flash memory device, CD player, DVD player, UMD player or other computer readable medium devices.

Figure 2:
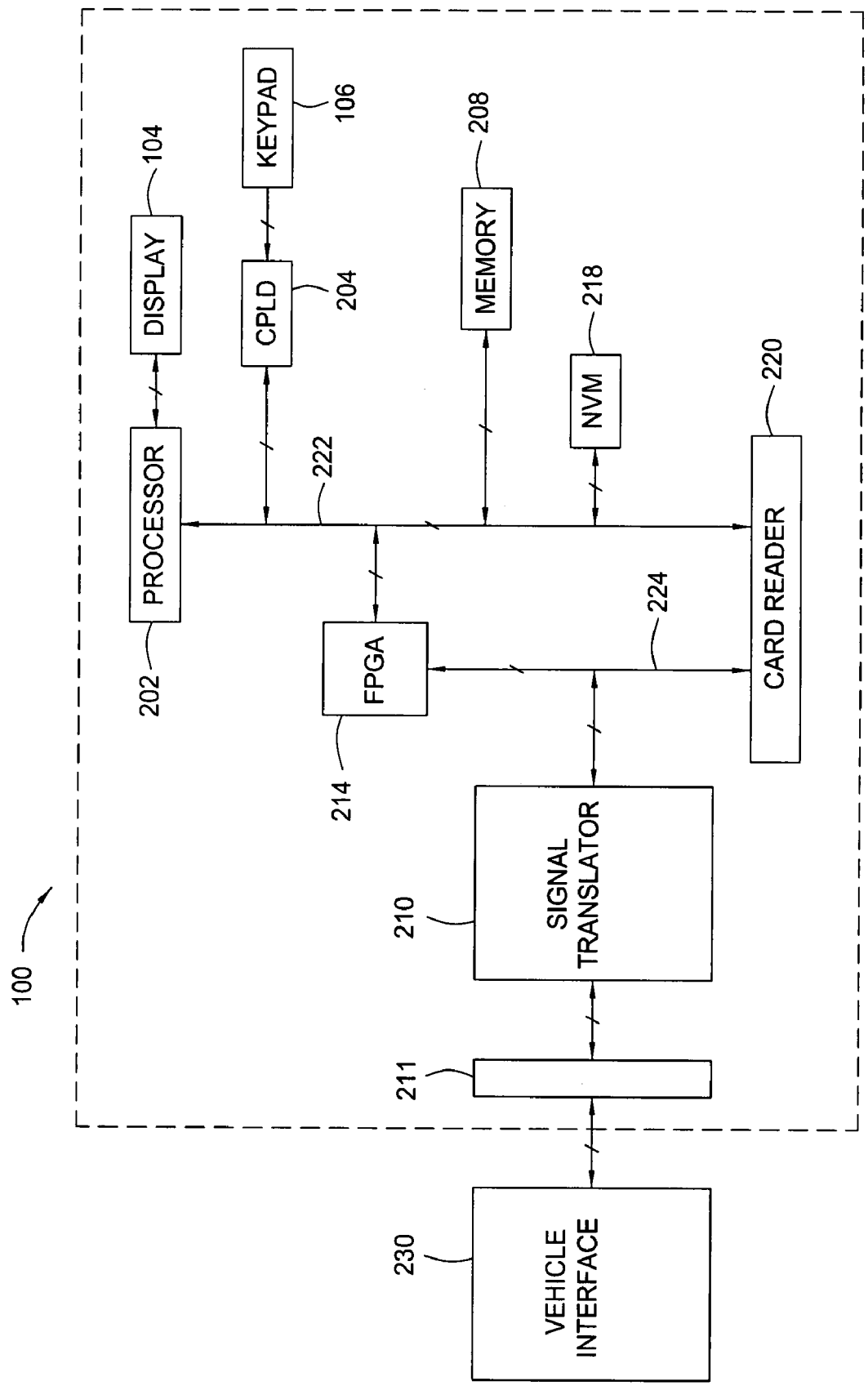
FIG. 2 is a block diagram of the components of the scan tool of FIG. 1.

FIG. 2 is a block diagram of the components of the scan tool 100. In FIG. 2, the scan tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, and a selectable signal translator 210. A vehicle communication interface 230 is in communication with the scan tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with scan tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4) or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by scan tool 100 to connect scan tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of scan tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software that operates the basic functions of the scan tool 100 can be stored in the memory subsystem 208, while the software to run the diagnostic functions of the scan tool can be stored on an external memory device such as a CF card.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

Figure 3:
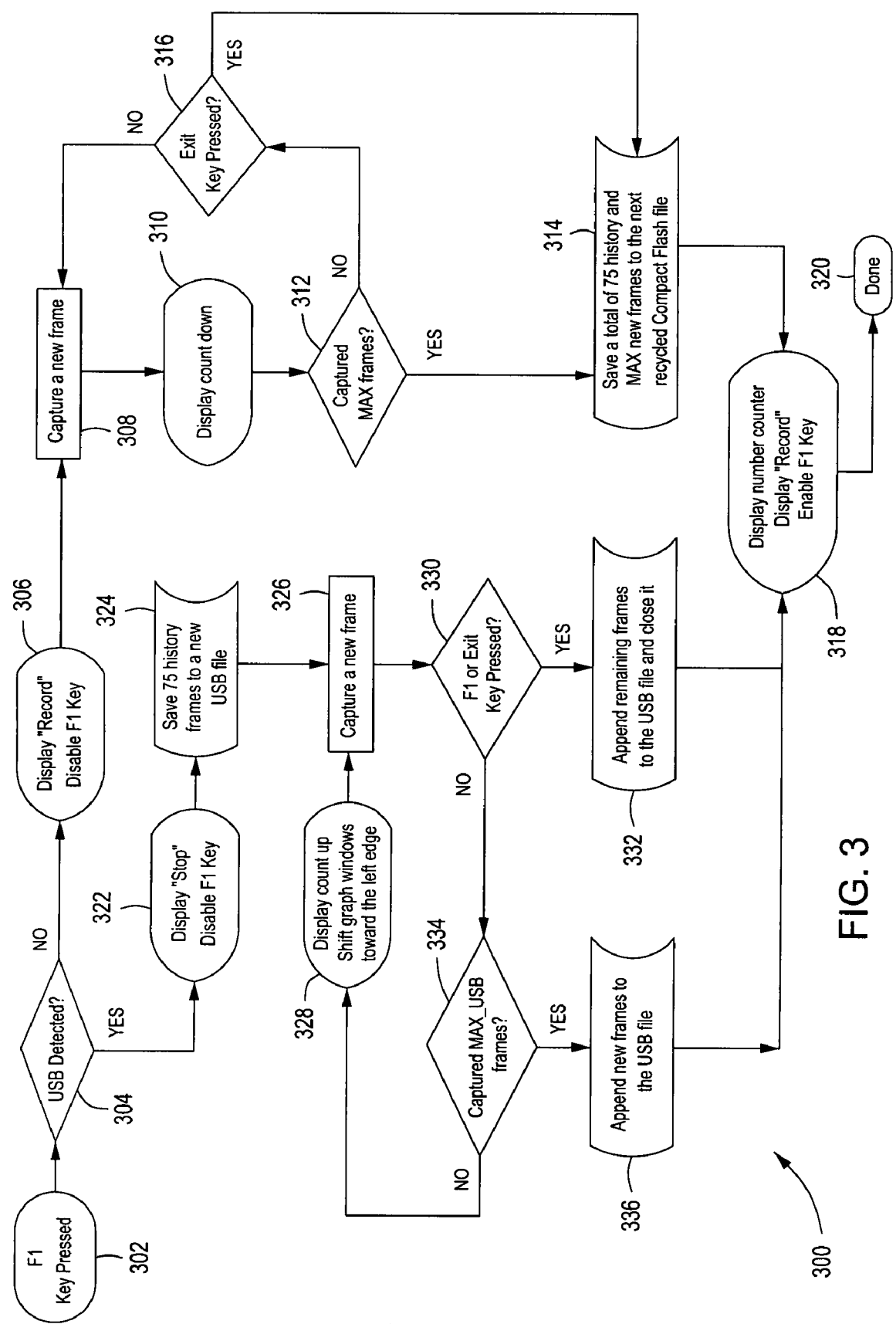
FIG. 3 is a flowchart illustrating steps for saving information onto a USB flash memory drive according to an embodiment of the invention.

FIG. 3 is a flowchart 300 illustrating steps for saving information onto a USB flash memory drive according to an embodiment of the invention. As stated above, the scan tool 100 runs on a proprietary operating system and does not recognize off-the-shelf USB flash memory devices that are formatted in DOS FAT16/FAT32 that run on Windows®, OS X from Apple® or other operating systems (Linux, etc). Software stored on the CF card can be utilized to detect a USB flash memory device that is not in the scan tool's propriety operating system's format i.e., the software is constructed and designed to interact with the USB flash memory device formatted to operate on operating systems, such as Windows®, Mac X from Apple®, Linux, etc., of a personal computer.

In one embodiment, the software includes a module that can interact directly with the drivers for the USB flash memory device regardless of the device's operating system format. The software can detect whether the USB flash memory device is present or coupled to the scan tool 100. The software module can have a communication portion that read and write information on the USB flash memory device even though the USB flash memory device card may not be in the proprietary operating system format of the scan tool. The software can access the USB flash memory device at a sector by sector level in order to read and/or write onto the device. In other words, the software can recognize if a USB flash memory device is coupled to the scan tool and then read and write onto the USB flash memory device without access or using the DOS FAT16/FAT32 file system.

At this point, the scan tool 100 can be linked to the ECU of the vehicle via a cable linked to the vehicle communication interface. As the scan tool 100 operates its diagnostic software, the scan tool collects diagnostic data from the vehicle. As stated above, the diagnostic data can be stored on the CF card, however, the available memory space is limited as the diagnostic software takes much of the CF card's memory.

Turning to FIG. 3, the flowchart 300 for the software starts at step 302, wherein "Record" is displayed on display 104 above an "F1" key or another function key. The user presses that function key in order to start recording diagnostic data. At step 304, the software detects if a USB flash memory drive is present, as explained above. If no, then the software proceeds to step 306, wherein "Record" is still displayed but the "F1" key is disabled. At this point, the scan tool will be collecting diagnostic data and storing it on an internal memory of the scan tool before transferring it to the CF card. At step 308, the scan tool collects data for one frame of the 150 frames to be collected. A person skilled in the art will recognize that the frames collected described herein can range from 1-1000 or higher depending on the memory in which the data is being stored on. At step 310, the software can display the count down of number of frames (150) remaining to be captured. Alternatively, the software can display counting up from the number of frames that has been captured. At step 312, the software determines if the maximum amount of frames (150) has been captured.

If no (step 312), then the software continues to step 316 and determines if the exit key has been pressed. If no, then the software continues back to step 308 (previously discussed), wherein a new frame of data is captured and stored. If at step 316, the exit key is pressed, then the software proceeds to step 314 (discussed below). Then the software proceeds to step 318 where the software causes the scan tool to display a number counter, display "Record" above the F1 key, and enables the F1 key. The program ends at step 320.

Turning back to step 312, if yes, then the software proceeds to step 314, where the software saves 150 frames (75 previously recorded frames and 75 newly recorded frames) onto the CF card. At any given time, approximately 20 or so data files (containing recorded frames) are saved on the CF card and are recycled in order to save space. At step 314, the software writes to the oldest data file of the 20 data files. This process ensures that the oldest data file is erased each time. After step 314, as previously discussed, the software proceeds to step 318 and the step 320.

Turning back to step 304, if the software detects a USB flash memory drive, then the software proceeds to step 322, where the software causes the scan tool to display "Stop" and enable the F1 key (if pressed again, will stop recording by the scan tool). At step 324, 75 history frames (previously saved on internal memory of the scan tool) are saved to a new USB file. At step 326, a new frame is captured by the software.

At step 330, the software determines if the F1 or the exit key has been pressed. If yes, then the program proceeds to step 332, where the remaining frames are appended to the file being saved to the USB flash memory drive and the file is closed. Then the software proceeds to step 318, previously discussed. Turning back to step 330, if no exit key was pressed, then the software proceeds to step 334, where the software determines if the maximum number of frames has been captured. In one embodiment, since the USB flash memory drive has more available memory, then more frames can be captured. The number of frames can be from 1-1000 or more. If no (step 334), then the software proceeds to step 328 and causes the display to display the counter, counting up (the number of frames captured so far) and proceeds back to step 326 (previously discussed). If yes (step 334), then the software proceeds to step 336, where the new frames are appended to the USB file and the file is closed, then the software proceeds to step 318 (previously discussed).

By being able to write directly onto the USB flash memory device without requiring a reformat of the operating system, XP or Vista for example, then the USB flash memory device can be used in a personal computer for further manipulation. The user can remove the USB flash memory device from the scan tool and plug it into the personal computer because it retained the XP format. Once the data on the USB flash memory device is available, it can be transferred to the personal computer or accessed with various programs stored thereon. The data can be further manipulated and displayed on the personal computer with software that can access the raw data format stored on the USB flash memory device. The data can also be imported into a spreadsheet for further manipulation or display.

The software can be stored on a computer readable medium such as a compact disc (CD), digital video disc (DVD), CF card or USB drives for installation on the computing device. The software allows the user to use off-the-shelf USB flash memory device without having to reformat it into the proprietary operating system used by scan tool manufacturers by writing directly onto the sectors of the memory device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer product for use by a vehicle diagnostic scan tool, the product comprising a non-transitory computer-readable storage medium in which program instructions are stored, which instructions, when read by the diagnostic scan tool, cause the diagnostic scan tool to perform the steps comprising:
    detecting a USB flash memory device that is formatted for an operating system that is different from an operating system used by the vehicle diagnostic scan tool that is coupled to the vehicle diagnostic scan tool;
    collecting diagnostic information from a vehicle that is coupled to the vehicle diagnostic scan tool; and
    writing the diagnostic information on the USB flash memory device that is formatted for an operating system that is different from the operating system used by the vehicle diagnostic scan tool at a sector level,
    wherein writing the diagnostic information on the USB flash memory device comprises writing on a sector by sector level; and wherein writing the diagnostic information on the USB flash memory device further comprises writing without using a file system.

2. The computer product of claim 1 further comprising saving diagnostic information on an internal memory of the vehicle diagnostic scan tool.

3. The computer product of claim 1 further comprising displaying a counter on a display of the vehicle diagnostic scan tool.

4. The computer product of claim 1 further comprising determining if a predetermined number of frames have been captured.

5. The computer product of claim 4, wherein the number of frames is between about 1-1000.

6. The computer of product of claim 4, wherein a file is closed when the predetermined number of frames have been captured.

7. The computer product of claim 1 further comprising communicating with a driver of the USB flash memory device in order to determine if the USB flash memory device is attached to the vehicle diagnostic scan tool.

8. The computer product of claim 1, wherein writing the diagnostic information on the USB flash memory device comprises writing without using a DOS FAT 16 or FAT 32 file system.

\* \* \* \* \*